Sept. 29, 1959   W. T. WAGNER   2,905,970

MOLD PIN CONSTRUCTION

Filed Dec. 3, 1952

INVENTOR.
WILLIAM T. WAGNER
BY
ATT'Y.

United States Patent Office 2,905,970
Patented Sept. 29, 1959

2,905,970

MOLD PIN CONSTRUCTION

William T. Wagner, Dayton, Ohio, assignor, by direct and mesne assignments, of one-half to The Dayton Rubber Company, a corporation of Ohio, and one-half to The B. F. Goodrich Company, Akron, Ohio, a corporation of New York Application December 3, 1952, Serial No. 323,780

2 Claims. (Cl. 18—39)

The present invention relates to an improved molding apparatus, and particularly to such an apparatus adapted for use in the molding of products composed of frothed or foamed latex and known as foam rubber or sponge rubber.

The use of core pins which extend into the mold cavity and impart a pattern of depressions in the molded foam rubber article is well established in the art. The function of these pins may be to increase the operative heat transfer surface between mold and rubber composition, to control, by proper spacing, the density of the molded article, or simply to reduce the amount of rubber required by increasing the number of cavities in the finished product.

Heretofore, such core pins have been made in a variety of shapes of wood, metal, and the like; and they have been arranged in various patterns within the mold cavity. While many expedients have been employed for securing these pins in the desired location within the mold, all of those which have come to my attention have involved the use of a threaded stud or similar mounting requiring that a hole be provided through the mold shell. When it is considered that the number of pins ordinarily used with a given mold is quite large and that they are closely spaced, it can be seen that the presence of a hole in the mold shell for each pin weakens the shell and materially shortens the effective life of the mold structure. At the same time, the provision of these holes along with the mounting studs and fasteners adds to the cost of the pins themselves so that a core pin mold is extremely expensive.

The above deficiencies and disadvantages notwithstanding, the pin mounting means have been generally acceptable. Where, however, it has been desired to employ a mold structure wherein the cavity encasing shell is itself surrounded with a fluid jacket or liner as, for example, to provide for the circulation of a refrigerant about the structure, the bolt-type fasteners for the core pins have been objectionable and unacceptable. In this type of mold, the hollow jacket must be so positioned that the fluid in the form of a liquid or a gas, which is often under pressure, contacts the outer surface of the mold shell encasing the rubber composition. The resulting proximity of circulating fluid to the rubber within the mold is, of course, desirable in that the temperature of the rubber composition may thereby be most efficiently controlled during the critical stages of its coagulation and vulcanization. Such proximity is not desirable, however, where the conventional core pin mounting arrangement is employed in that the penetrating fluid within the liner will leak around the studs or bolts through the holes provided in the mold shell to receive them. In this manner, the circulating fluid comes in direct contact with the rubber composition within the mold and serious damage results to the article being formed.

In the past, washers, gaskets, and other sealing devices have been used in connection with the core pin mountings to prevent leakage of fluid into the mold cavity, but they have given only partial improvement far out of proportion to the increased expense and inconvenience incident to their provision. Though temporary imperviousness be established, the corrosive effects of the fluid circulating within the jacket and in direct contact with the core pin mountings or anchors soon creates minute openings around the fasteners allowing the penetrating fluid to pass into the mold cavity to the serious damage of the article therein.

It is an object of the present invention to provide a satisfactory mold having a plurality of core pins extending into the cavity thereof.

It is another object of this invention to provide a novel arrangement for mounting the core pins on the mold casing.

It is a further object of the present invention to provide such a mounting arrangement which will neither weaken the mold casing nor add materially to the cost of the mold.

It is still another object of this invention to provide a mold construction suitable for use in the manufacture of foam rubber articles.

It is a still further object of the present invention to provide a mold construction employing a plurality of core pins extending into the cavity thereof and a jacket or liner to house a fluid for controlling the temperature of the article being formed within the cavity thereof.

These and other apparent objects and advantages I propose to achieve by providing a core pin mounting which will obviate the necessity for a hole through the mold shell or casing. Such a mounting will involve a recessed channel or pocket conforming to the cross section of the core pin to be used, which channel shall extend only partially through the shell of the mold leaving the outer surface thereof smooth, continuous and imperforate. The operation in which grooves or channels of the type referred to are formed, is commonly known as trepanning. The base portion of the core pin will then fit into the recess where it will be secured by cementing or similar means hereinafter more fully described.

Since the construction of this invention involves no apertures through the mold shell, a large number of core pins may be mounted thereon without seriously weakening the mold. Since no bolts or mounting studs are required in the mold of this invention, the addition of the core pins will not excessively increase the weight or cost of the mold. Because the exterior surface of the mold casing is free of any openings, the danger of a fluid leak into the mold cavity is eliminated.

Figure 1:
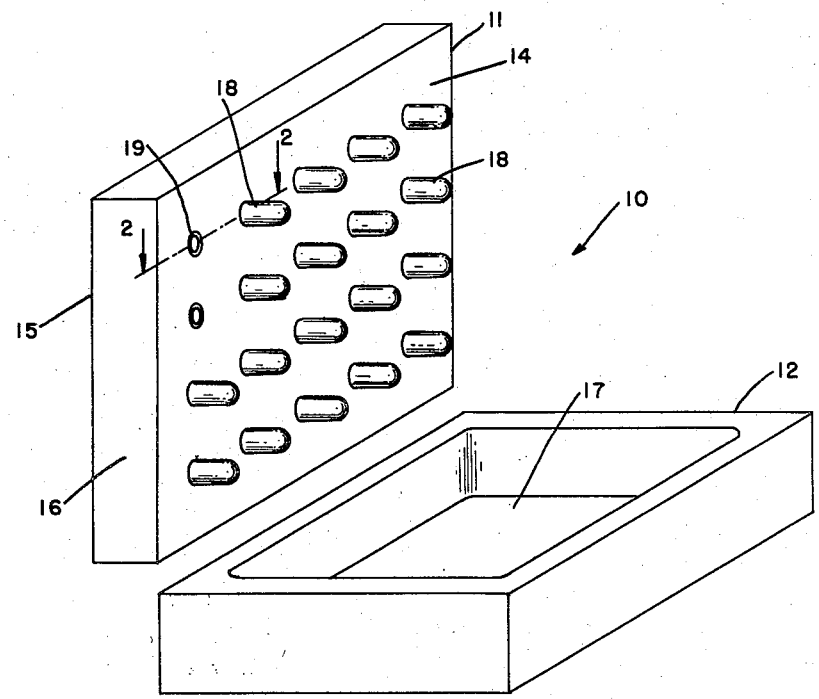
Figure 1 is a perspective of a two-part hollow-walled mold embodying the core pin mounting of this invention.

A typical embodiment of the principles of this invention as illustrated in Figure 1 is a two-part, single cavity mold 10 which is composed of an upper member 11 and a lower member 12. These two components may be vertically acting or may open and close pivotally about a hinged joint. In the illustration, the mold 10 is manually operated and the separate members are shown in opened relation to receive the material to be molded. It is to be understood that any appropriate arrangement may be made for causing the upper member 11 to close upon the lower member 12.

Figure 2:
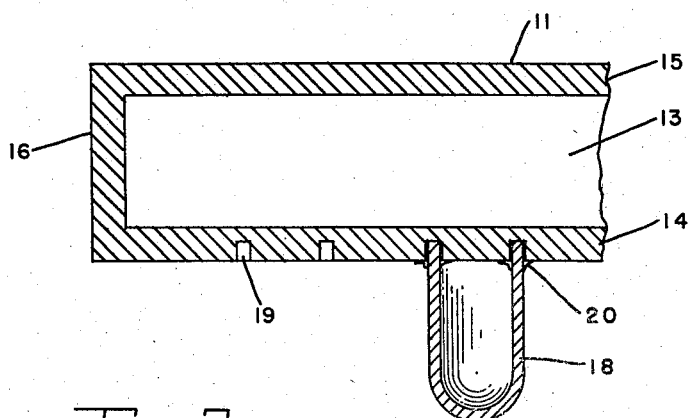
Figure 2 is a transverse cross section through a portion of Figure 1 along line 2—2.

As best shown in Figure 2, the top member 11 is in the form of a hollow jacketed assembly comprising the chamber 13 which is defined by the bottom wall 14, the top wall 15, and side walls 16, all of which may be composed of any suitable material such as metal, preferably aluminum. The chamber 13 is adapted to receive a circulating liquid or gaseous fluid such as a refrigerant or coolant, steam or hot water, or other heating fluids, to regulate the temperature within the mold. The lower member 12 may be similarly composed of a metallic composition such as aluminum and comprises the mold cavity which is surrounded on its bottom and all sides by walls forming a hollow chamber for receiving a coolant just as in the case of the chamber 13 of the upper member 11 described above. Viewing the mold as a whole in closed position reveals that the same consists of a cavity 17 surrounded by hollow walls adapted to house a circulating fluid.

The top member 11 is additionally provided with a plurality of core pins 18 perpendicularly disposed to the bottom wall 14 and adapted to depend into the mold cavity 17 when the mold is closed. As best shown in Figure 2, a typical core pin used in the type of mold being considered is a hollow cylindrical sleeve 18 closed at its depending end and open at the other. When the upper mold member 11 is closed upon the lower member 12, the pins 18 will displace the rubber composition within the mold to form the above-mentioned depressions in the molded product.

For mounting the pins 18, annular grooves 19 are provided which are adapted to receive the open end of the pins. These grooves are cut or trepanned or otherwise provided to a depth less than the thickness of the bottom wall 14 so that the upper surface of said wall; i.e., the surface to be exposed to the coolant within the chamber 13, is free of any perforations which would allow such coolant to penetrate the wall 14 and pass into the mold cavity 17. The width and contour of the groove 19 should substantially conform to the thickness and contour of the wall of the pins 18 so that a tight fit between the two will be effected. To secure the pins in permanently fixed position within the grooves, a heat hardening thermosetting resinous adhesive 20 should be applied to the grooves and to the portions of the pins to be inserted therein. Since the joint between pins and the grooves in the mold shell will be protected from fluids circulating within the chamber 13, the adhesive employed need not have any particular properties of resistance to solvents. On the other hand, since the mold will be repeatedly subjected to vulcanizing temperatures of the order of 300° F., the adhesive chosen should have good resistance to heat as well as metal-to-metal bonding properties. Such adhesives suitable for this application are solutions or dispersions of the phenolic resins such as the phenol-aldehyde resins, urea-aldehyde resins, melamine resins, polyester resins, epoxy resins, furan, and the like. It has been found beneficial to increase the conductivity of whatever adhesive is used by admixing therewith metallic dust, preferably aluminum dust or powder in proportions of from 10 to 50 parts by weight based upon the weight of the resinous material. Instead of using adhesives, the grooves may be cut slightly undersize and the pins wedged or forced into the grooves to give a force-fit.

While the present invention has been described in connection with its application to the use of hollow core pins with hollow-walled jacket type molds, it is to be understood that the mounting of pins to the mold shell according to this invention is equally advantageous where solid core pins and mold shells are encountered. Where solid pins are employed, the recesses on the cavity side of the mold walls will, of course, be altered to accommodate a solid, as opposed to an annular object. In any event, the depth of the recess will not exceed say three-fourths the thickness of the mold wall, so that the walls will not be weakened by a plurality of closely spaced apertures. The use of the thermosetting resinous adhesive together with the forced fit of the pins within said recesses will satisfactorily anchor the pins in the desired position without the use of threaded mounting studs, bolts, and other weight and cost increasing means.

Although the present invention has been set forth in considerable detail, it is to be understood that the specific examples and embodiments referred to herein are for descriptive purposes only and do not limit the scope of the principles as defined in the subjoined claims.

I claim:

1. A molding apparatus comprising a cavity encasing imperforate shell surrounded by a heat transfer fluid-accommodating jacket, the cavity side of said shell having a plurality of recesses therein and a plurality of core pins conforming in cross section to said recesses and projecting into said cavity therefrom, said core pins cemented in said recesses by a thermosetting resinous adhesive comprising a substantial proportion of a metallic powder, said recesses extending only partially through said shell leaving that surface thereof adjacent said jacket continuous and imperforate whereby heat transfer from said jacket to said pins and to said cavity is most advantageously effected and said cavity is completely protected from said fluid.

2. A molding apparatus according to claim 1 in which said metallic powder is aluminum.

References Cited in the file of this patent

UNITED STATES PATENTS

| | | |
|---|---|---|
| 2,351,529 | Luxenberger et al. | June 13, 1944 |
| 2,371,847 | Saunders et al. | Mar. 20, 1945 |
| 2,691,190 | Bethe et al. | Oct. 12, 1954 |